United States Patent [19]

Wilhelm

[11] 4,187,717
[45] Feb. 12, 1980

[54] APPARATUS AND METHOD FOR TESTING PRODUCTS FOR LEAKS

[75] Inventor: Larry A. Wilhelm, Owosso, Mich.

[73] Assignee: Midland-Ross Corporation, Cleveland, Ohio

[21] Appl. No.: 916,610

[22] Filed: Jun. 19, 1978

[51] Int. Cl.² ............................................. G01M 3/28
[52] U.S. Cl. ................................................. 73/46
[58] Field of Search ................... 73/40, 46, 49.1, 49.2, 73/49.3

[56] References Cited

U.S. PATENT DOCUMENTS

| 2,908,158 | 10/1959 | Jacobsson | 73/46 |
| 3,188,855 | 6/1965 | Dega | 73/46 X |
| 3,233,447 | 2/1966 | Horrell | 73/46 |
| 3,827,285 | 8/1974 | Grove | 73/46 |
| 3,987,664 | 10/1976 | Hass | 73/49.2 |

Primary Examiner—Donald Watkins
Attorney, Agent, or Firm—H. Duane Switzer

[57] ABSTRACT

A product having primary and secondary air chambers is tested for leaks by pressurizing such chambers to substantially different pressures from a common supply air source. Subsequent to charging the chambers to the predetermined pressures, any air flow occurring from the supply air source is indicative of a product leak. Secondary air is supplied to the product secondary air chamber through an electrically operated valve provided with signals by a transducer which senses the pressure in the secondary air chamber.

11 Claims, 2 Drawing Figures

APPARATUS AND METHOD FOR TESTING PRODUCTS FOR LEAKS

BACKGROUND OF THE INVENTION

This application relates to the art of testing apparatus and methods and, more particularly, to such apparatus and methods for testing products for air leaks. The invention is particularly applicable for use in testing valves and the like for leaks. However, it will be appreciated that other products having separate air chambers normally charged to different pressures can also be tested with the apparatus and method of this application.

Certain products, such as air valves and the like, have a certain permissible maximum combined leak from primary and secondary air chambers. The use of a single supply air source for supplying both primary and secondary air chambers requires a pressure regulator for pressurizing the secondary air chamber to a secondary air pressure substantially lower than the primary air chamber. The use of conventional pressure regulators makes it difficult to measure for leaks because standard pressure regulators have a built in leak which adds to any leakage occurring through the product.

It would be desirable to provide an arrangement for regulating secondary air pressure without having any leaks in the supply path so that any indicated air flow on an air flow indicating device represents a leak through the product being tested.

SUMMARY OF THE INVENTION

A product to be tested for air leaks includes primary and secondary air chambers chargeable to substantially different pressures from a supply air source having a supply air pressure substantially greater than atmospheric. Primary air supply means is connected between the supply air source and the primary air chamber of the product. Secondary air supply means is connected between the supply air source and the secondary air chamber of the product.

Electrically operated valve means in the secondary air supply means is provided for regulating air flow therethrough for charging the secondary air chamber with a secondary air pressure. The primary air supply means charges the primary air chamber with a primary air pressure substantially greater than atmospheric. The secondary air chamber is charged to a secondary air pressure greater than atmospheric but substantially less than the primary air pressure.

Sensing means is provided for sensing the pressure in the secondary air chamber and providing electrical signals to the valve means for regulating same to develop and maintain the secondary air pressure in the secondary air chamber.

The sensing means includes a transducer, a comparator and an oscillator. The oscillator operates to provide a constant pulsating signal to the valve means for fluttering operation of the valve means to regulate flow therethrough. The transducer is operative for sensing the pressure in the secondary air chamber and providing electrical signals to the comparator. The comparator receives the transducer signal and and compares same with a reference signal proportional to the desired secondary air pressure in the secondary air chamber. The comparator provides an output comparator signal when the transducer and reference signals match. The comparator signal inhibits or stops the oscillator so the valve means closes. Flow indicating means is provided between the supply air source and the primary and secondary air supply means. Subsequent to charging of the primary and secondary air chambers to their primary and secondary air pressures, the flow indicating means will indicate any flow occurring from the supply air source toward the product for indicating the total combined leak which may be occurring from the primary and secondary air chambers.

It is a principal object of the present invention to provide an improved apparatus and method for testing products for air leaks.

It is a further object of the invention to provide an improved air leakage test apparatus having a secondary air supply path which is not subject to leakage.

It is another object of the invention to provide an improved apparatus and method for testing a product for a combined leak from two different air chambers which are pressurized to substantially different pressures.

DESCRIPTION OF A PREFERRED EMBODIMENT

Figure 1:
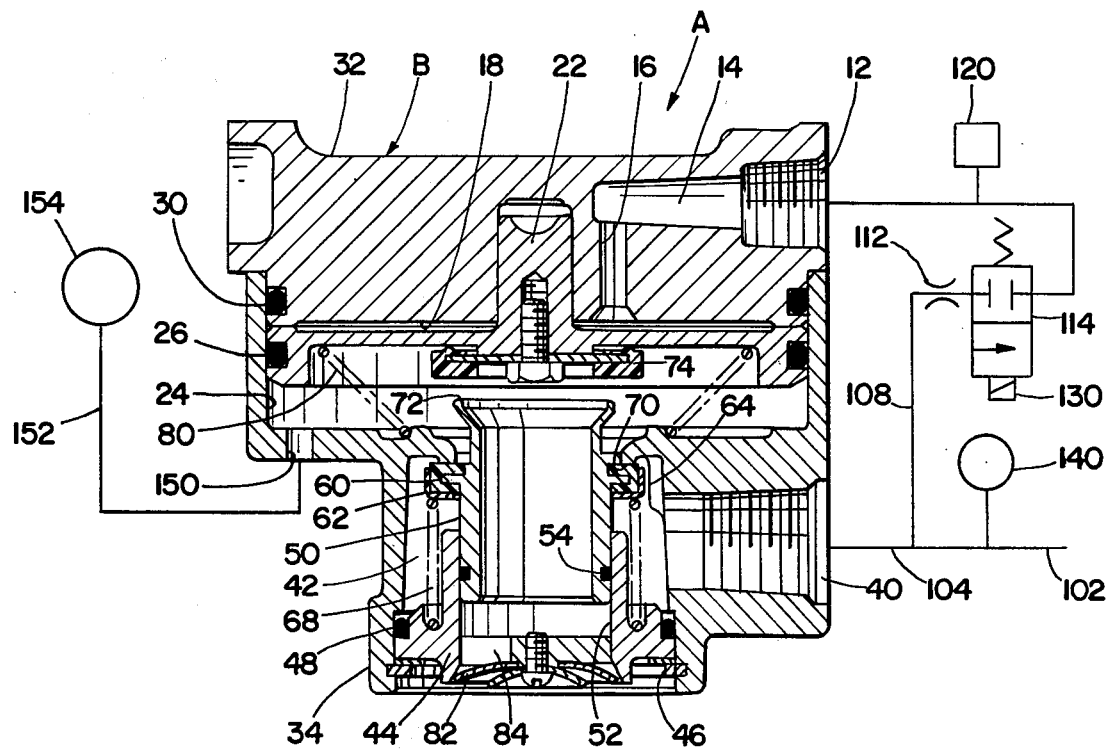
FIG. 1 is a cross-sectional elevational view of a valve to be tested in accordance with the apparatus and method of the present application, and with portions of the test apparatus diagrammatically indicated as being connected with the valve.

With reference to the drawing, FIG. 1 shows a product A in the form of a valve to be tested for leaks. The valve includes a housing B having a secondary air port 12 connected by passages 14, 16 with a secondary air chamber 18 above a piston member 22 which is reciprocable in a housing cylindrical cavity 24 which also defines a primary air chamber on the opposite side of piston 22 from secondary air chamber 18. A circumferential seal 26 is provided between the piston 22 and cavity 24. A circumferential seal 30 is also provided between upper and lower portions 32 and 34 of housing B which are suitably bolted together in a known manner.

A primary air supply port 40 leads to an annular cavity 42 having a guide and retainer member 44 received therein and held in position by a snap ring 46. A circumferential seal 48 is provided between guide and retainer member 44, and the wall of annular cavity 42. A hollow valve member 50 is slidably received within a cylindrical hole 52 in guide and retainer member 44. A suitable circumferential seal 54 is provided between valve member 50 and hole 54.

An outwardly extending flange on valve member 50 receives an elastomeric member 60 held in position by a cup member 62 guided in longitudinal flutes 64. Valve member 50 is biased upwardly in FIG. 1 by a coil spring 68 for engaging elastomeric member 60 with a valve seat 70 on housing B. A circumferential valve seat 72 on valve member 50 is cooperable with elastomeric washer 74.

Piston 22 is normally biased upwardly in FIG. 1 by a coil spring 80. A flexible diaphragm 82 secured to guide and retainer member 44 extends over outlet port 84 to prevent entry to dirt into the valve. Diaphragm 82 provides free flow of air outwardly through outlet port 84.

In describing the operation of the test apparatus and method, examples of pressures will be used for one test procedure. It will be recognized that the apparatus and method of the present application may be used with a wide range of pressures and that the pressures given are for purposes of example only.

A supply air source generally indicated at 102 is connected with a suitable source of pressurized air substantially above atmospheric pressure, such as around 125 psi. Primary air supply means 104 is directly connected from supply air source 102 to primary air supply port 40. Primary air supply means 104 is then connectable past valve member 50 with primary air chamber 24. Primary air supply means 104 is connected for supplying primary air at a primary air pressure substantially greater than atmospheric. In the arrangement shown, primary air supply means 104 is capable of supplying primary air at a pressure of approximately 125 psi.

Secondary air supply means indicated generally at 108 is connected between supply air source 102 and secondary air supply port 12 for supplying secondary air to secondary air chamber 18. Secondary air supply means 108 includes an air flow restriction 112 and an electrically operated valve means 114 in the form of a solenoid valve.

Sensing means is provided for sensing the pressure in secondary air chamber 18 and providing electrical signals to valve means 114 for regulating operation of same to supply secondary air through secondary air supply means 108 until secondary air chamber 18 is at a desirable predetermined secondary air pressure above atmospheric but substantially below the primary air pressure. In the arrangement shown and described, the desirable pressure in secondary air chamber 18 is around 10 psi. Sensing means in the form of a transducer 120 is provided for sensing the pressure within secondary air chamber 18 and transmitting an electrical transducer signal to an amplifier 122 which amplifies the transducer signal and feeds same to a comparator 124 to which a suitable reference comparator signal is fed. The reference comparator signal is compared with the transducer signal in comparator 124 and, when the two signals match, the comparator supplies an output comparator signal to an oscillator 126 for stopping or inhibiting operation of such oscillator. Prior to receiving the inhibit signal from comparator 124, oscillator 126 normally supplies electrical pulses to a driver 130 of solenoid valve 114 for operating such valve in a fluttering manner so that it rapidly opens and closes for relatively slowly supplying secondary air to secondary air chamber 18. Oscillator 126 preferably provides electrical pulses to driver 130 at around 30-40 cycles per second.

It will be recognized that the reference comparator signal provided for comparator 124 may be varied in order to vary the secondary air pressure within secondary air chamber 18 at which valve 114 will close. When the electrical transducer signal reaches the level of the reference comparator signal, comparator 124 provides an output comparator signal for inhibiting operation of oscillator 126. Thus, driver 130 no longer operates for fluttering valve 114. Flow restriction 112 may also be variable if so desired and provides a flow rate therethrough which is less than the flow rate through valve 114. This maintains a higher accuracy of the test device because there is very little conduit to be repressurized once valve 114 is closed.

A flow indicating device 140 is provided between supply air source 102, and primary and secondary air supply means 104 and 108. Flow indicating means 140 may take many forms and may be any suitable type of air flow meter. Flow indicating means 140 may simply be a visual ball-type of flow indicator wherein a ball rises in a gauge to indicate flow rate. In operating the device, a product to be tested such as valve A is connected as shown. Supply air source 102 is then turned on for supplying air to primary air supply means 104 and secondary air supply means 108. Primary air is blocked at port 40 because valve member 50 is in the closed position shown in FIG. 1. Secondary air flows into secondary air chamber 18 for moving piston 22 downwardly in FIG. 1 until elastomeric washer member 74 engages seat 72 for closing the internal bore through valve member 50. Engagement of elastomeric washer member 74 with seat 72 also causes valve member 50 to move downwardly in FIG. 1 against the biasing force of spring 68 for displacing elastomeric member 60 from valve seat 70. This allows flow of primary air from port 40 past flutes 64 and seat 70 into primary air chamber 24. Primary air flows through delivery port 150 and then through a conduit 152 to a reservoir 154. As pressure builds up within primary air chamber 24, the force acting on piston 22 within primary air chamber 24 will equal the force acting on the opposite side of piston 22 in secondary air chamber 18. When that condition occurs, valve member 50 will again be in the position shown in FIG. 1 with elastomeric member 60 engaged with seat 70 for blocking flow from port 40 to primary air chamber 24. Elastomeric washer member 74 will also be engaged with seat 72 for preventing air from being exhausted from primary air chamber 24. When supply air source 102 is first opened for supplying air, there is a fairly rapid flow of air as secondary air chamber 18 is pressurized to the predetermined secondary air pressure for opening valve member 50 and supplying primary air to primary air chamber 24. Once the air delivery has been made and the test product is under the desired pressure, flow should stop and this is readily indicated by indicating means 140. A rapid drop in air flow indicates that the test product is at the desired test pressure. A continued indication of slow flow through the product by indicating means 140 will indicate that a leak is occurring. The flow rate indicated by indicating means 140 will tell the test operator whether the leak is above or below the desired standards. A leak indicates that leakage is occurring past one of the described seals to atmosphere.

Figure 2:
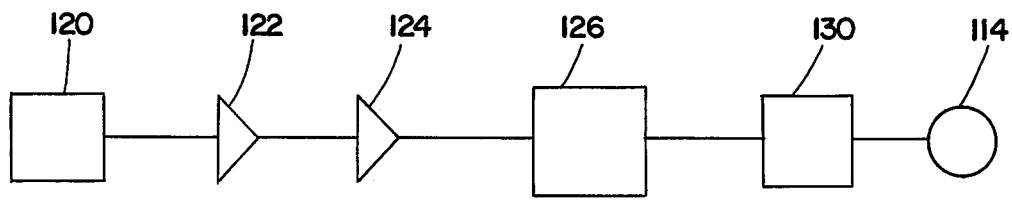
FIG. 2 is a diagrammatic illustration of a portion of the test apparatus of the present application for use in testing the product of FIG. 1.

The sensing means defined by the arrangement diagrammatically shown in FIG. 2 accurately delivers and maintains a secondary air pressure within secondary air chamber 18. Transducer 120 constantly senses and checks the pressure within secondary air chamber 18 for operating valve 114 in a fluttering manner until the desired pressure is reached and the valve is closed. Any leakage which occurs from secondary air chamber 18 will reduce the pressure thereof and cause transducer 120 to again provide signals for operating valve 114 and supplying additional air to secondary air chamber 18.

The arrangement of the present application provides the supply of primary and secondary air at substantially different pressures from a common supply air source. The test arrangement further provides an indication of a combined leak from the test product. Thus, the leak indicated by indicating means 140 may be occurring from either or both of secondary and primary air chambers 18 and 24. This greatly simplifies testing of a product having two different chambers because it is not necessary to visually check two different flow meters and add any leaks which may be occurring.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. Testing apparatus for determining leakage in products to which primary and secondary air is supplied at substantially different pressures comprising: a supply air source having a supply pressure substantially greater than atmospheric, primary air supply means for supplying primary air from said supply air source to a test product at a primary air pressure substantially greater than atmospheric, secondary air supply means for supplying secondary air from said supply air source to a test product, said secondary air supply means including sensing means for sensing the secondary air pressure in a test product, said secondary air supply means including valve means for opening and closing flow of secondary air to a test product, said valve means being responsive to said sensing means for supplying and maintaining in a test product a predetermined secondary air pressure above atmospheric and substantially less than said primary air pressure, and flow means for indicating flow from said supply air source to said primary and secondary air supply means.

2. The apparatus of claim 1 wherein said valve means is electrically operated and said sensing means provides electrical signals for operating said valve means.

3. The apparatus of claim 2 wherein said sensing means provides electrical pulses for fluttering operation of said valve means.

4. The apparatus of claim 3 wherein said sensing means includes a transducer, a comparator and an oscillator, said transducer being operative for sensing the secondary air pressure in a test product and providing electrical transducer signals proportional such pressure, said comparator being operative for receiving said transducer signals and comparing same with a comparator reference signal representative of a desired secondary air pressure in the test product, said oscillator being operative for providing control signals for operating said valve means, and said comparator providing a comparator signal for inhibiting said oscillator to close said valve means when said transducer and reference signals match.

5. Testing apparatus for determining leakage in a test product having primary and secondary air chambers to which primary and secondary air are supplied, said apparatus including a supply air source having a supply pressure substantially above atmospheric, primary air supply means for supplying primary air from said supply air source to said primary air chamber at a primary air pressure substantially greater than atmospheric, secondary air supply means for supplying secondary air from said supply air source to said secondary air chamber for developing therein a secondary air pressure greater than atmospheric and substantially less than said primary air pressure, flow indicating means for indicating the combined flow through said primary and secondary air supply means from said supply air source, said secondary air supply means including electrically operated valve means for regulating flow of secondary air through said secondary air supply means, sensing means for sensing the pressure in said secondary air chamber and providing signals to said valve means for operating same.

6. The apparatus of claim 5 wherein said sensing means provides electrical pulses to said valve means for fluttering operation of said valve means to provide flow therethrough.

7. The apparatus of claim 6 wherein said secondary air supply means includes flow restricting means ahead of said valve means, and said valve means providing a greater flow rate therethrough during fluttering operation thereof than the flow rate through said flow restricting means.

8. The apparatus of claim 5 wherein said sensing means includes a transducer, a comparator and an oscillator, said transducer being responsive to the pressure in said secondary air chamber for providing transducer signals to said comparator, said comparator being responsive to said transducer signals for comparing same with a comparator reference signal representative of said secondary air pressure, and said comparator providing a comparator output signal to said oscillator when said transducer and reference signals match for inhibiting operation of said oscillator and closing said valve means.

9. A method of testing for leaks in a product having primary and secondary air chambers, comprising the steps of: providing a supply air source, connecting a primary air supply path between said supply air source and said primary air chamber, connecting a secondary air supply path between said supply air source and said secondary air chamber, supplying air through said primary air path at a primary air pressure substantially greater than atmospheric for pressurizing said primary air chamber, supplying air through said secondary air supply path to said secondary air chamber for pressurizing said secondary air chamber to a secondary air pressure greater than atmospheric and substantially less than said primary air pressure, sensing the pressure in said secondary air chamber for regulating flow through said secondary air path, and checking for any air flow from said supply air source to said primary and secondary air paths subsequent to pressurization of said primary and secondary air chambers.

10. The method of claim 9 wherein said step of sensing the pressure in said secondary air chamber and regulating flow through said secondary air path is carried out by providing an electrically operated valve in said secondary air path, and sensing the pressure in said secondary air chamber for providing electrical signals to said valve.

11. Apparatus for regulating air flow to a chamber for pressurizing same to a predetermined pressure comprising: a supply air source, an air supply path from said source to a chamber, electrically operated valve means in said path, sensing means for sensing the pressure in said chamber and providing electrical signals to said valve means for regulating said valve means to supply and maintain said predetermined pressure in said chamber, said sensing means including a transducer, a comparator and an oscillator, said transducer being connected for sensing the pressure in said chamber and providing transducer signals, said comparator being operative to receive said transducer signals and compare same with a comparator reference signal proportional to said predetermined pressure and to provide a comparator output signal when said transducer and reference signals match, and said oscillator normally being operative to provide a pulsing control signal to said valve means for fluttering operation of same and being inhibited upon receipt of said comparator output signal to maintain said valve means closed.

* * * * *